(12) United States Patent
Dettinger et al.

(10) Patent No.: US 7,689,555 B2
(45) Date of Patent: Mar. 30, 2010

(54) CONTEXT INSENSITIVE MODEL ENTITY SEARCHING

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1477 days.

(21) Appl. No.: 11/035,567

(22) Filed: Jan. 14, 2005

(65) Prior Publication Data
US 2006/0161522 A1    Jul. 20, 2006

(51) Int. Cl.
*G06F 7/00* (2006.01)
(52) U.S. Cl. .................... 707/5; 707/1; 707/3; 707/4; 707/102
(58) Field of Classification Search .............. 707/1, 707/3, 4, 100, 104.1, 200, 5, 102
See application file for complete search history.

(56) References Cited

U.S. PATENT DOCUMENTS

| | | | |
|---|---|---|---|
| 5,920,870 A * | 7/1999 | Briscoe et al. | 707/103 R |
| 6,581,054 B1 * | 6/2003 | Bogrett | 707/4 |
| 6,725,227 B1 | 4/2004 | Li | |
| 7,263,517 B2 * | 8/2007 | Sheu et al. | 707/3 |
| 7,475,058 B2 * | 1/2009 | Kakivaya et al. | 707/3 |

OTHER PUBLICATIONS

U.S. Appl. No. 10/083,075, "Application Portability and Extensibility Through Database Schema and Query Abstraction", filed Feb. 26, 2002.
U.S. Appl. No. 11/005,418, "Abstract Query Plan", filed Dec. 6, 2004.
U.S. Appl. No. 10/403,356, "Dealing with Composite Data Through Data Model Entities", filed Mar. 31, 2003.

* cited by examiner

*Primary Examiner*—Tim T. Vo
*Assistant Examiner*—Dangelino N Gortayo
(74) *Attorney, Agent, or Firm*—Patterson & Sheridan, LLP

(57) ABSTRACT

Methods, systems, and articles of manufacture for context insensitive model entity searching are provided. A model entity is used to identify to a central entity or concept modeled by a database abstraction model. Instances of a model entity may be defined in reference to an identifier in an underlying database. Model entity relationships specify relationships between the model entity and other datasets in the database (e.g., tables of a relational database). A database abstraction model provides an interface to both the model entity and the data in the underlying database. Rather than creating a query of the database using a series of restrictive conditions, or selecting individual the tables or datasets to search, a user may specify search term(s). Instances of the model entity containing the search term(s), regardless of where the search term(s) occur in the underlying database, are returned for the search. Thereafter, a user may select individual instances of the model entity to view in greater detail.

19 Claims, 12 Drawing Sheets

| DATABASE ABSTRACTION MODEL | 148 |

| MODEL ENTITIES |

Patient :
   Identifier : Patient.pid — 222
   Model Entity Relationships : — 225
     Patient.pid (1) → Test.pid (many)
     Patient.pid (1) → Visit.pid (many)
     Patient.pid (1) → Diagnosis.pid (many) — 226
     Test.doctorID (1) → Employee.EID (1)
     Visit.doctorID (1) → Employee.EID (1)
     Diagnosis.doctorID (1) → Employee.EID (1)
     Visit.vid (1) → Visit detail.vid (many)

(224 points to the Model Entity Relationships group)

| LOGICAL FIELDS |

$210_1$, $212_1$ — Name = "Patient ID"  — $208_1$
   Access Method = "Simple"
   Table = "Patient"
   Column = "PID"

$210_2$, $212_2$ — Name = "Patient Name"  — $208_2$
   Access Method = "Simple"
   Table = "Patient"
   Column = "Name"

$210_3$, $212_3$ — Name = "MelanomaTest"  — $208_3$
   Access Method = "Filtered"
   Table = "Tests"
   Column = "Value"
$214_1$ — Filter: Type = "21"

$210_4$, $212_4$ — Name = "Hemoglobin Test"  — $208_4$
   Access Method = "Filtered"
   Table = "Tests"
   Column = "Value"
$214_2$ — Filter: Type = "45"

$210_5$, $212_5$ — Name = "Patient Age"  — $208_5$
   Access Method = "Composed"
   Table = "Patient"
   Column = "Birthdate"
215 — Composition = "<Current date>-Patient.Birthdate"

*FIG. 3C*

CONTEXT INSENSITIVE MODEL ENTITY SEARCHING

CROSS-REFERENCE TO RELATED APPLICATIONS

This application is related to a commonly assigned, co-pending, U.S. patent application Ser. No. 10/083,075, filed Feb. 26, 2002, entitled "Application Portability and Extensibility through Database Schema and Query Abstraction," incorporated herein by reference in its entirety. This application also is related to commonly assigned, co-pending U.S. patent application Ser. No. 10/403,356, filed Mar. 31, 2003, entitled "Dealing with Composite Data through Data Model Entities," incorporated herein by reference in its entirety. This application is also related to commonly assigned, U.S. patent application entitled "Abstract Query Plan", Ser. No. 11/005,418, filed Dec. 6, 2004, incorporated herein by reference in its entirety. This application is also related to commonly assigned, U.S. patent application entitled "Abstract Records", filed herewith, incorporated herein by reference in its entirety.

BACKGROUND OF THE INVENTION

1. Field of the Invention

The present invention generally relates to computer databases. More specifically, the present invention relates to database applications for searching, querying, and rendering data retrieved from an underlying physical database using a database abstraction model.

2. Description of the Related Art

Databases are well known systems for information storage and retrieval. The most prevalent type of database used today is the relational database, which stores data using a set of tables that may be reorganized and accessed in a number of different ways. A relational database management system (DBMS) uses relational techniques for storing and retrieving data.

Structured Query Language (SQL) is a standardized database language that includes commands for retrieving, storing, updating, and deleting data stored in a relational database. An SQL query is constructed as a text string that must conform to the strict grammar and syntax requirements of the SQL query language. Further, an SQL query must be semantically correct to perform as desired by the user. That is, many syntactically correct SQL statements may fail to perform as desired due to semantic errors.

Although SQL provides a flexible and powerful method to query a relational database, most average users, and even many sophisticated users, find it very difficult to compose an SQL query that retrieves the desired query results. For example, consider a relational database storing data about patients at a hospital or research institution. Such a database might include tables that store patient demographic information, test results data, diagnoses, patient visits, doctor notes etc. Querying such a database using SQL requires a user to, at a minimum, identify what tables might include data that the user is interested in seeing, specify which columns from theses tables to include in the query results, provide selection criteria used to evaluate what data from the columns to include in query results, and specify how to join data from different tables together.

Forcing users to think about data in terms of tables, rows, and columns, however, distorts the way users understand and conceive queries. That is, users typically conceive of data from a logical perspective, according to relationships between data and a central entity or concept that a user wishes to query, i.e., a model entity. For example, using the relational database described above, a user may be interested in querying the database to learn about "patients" or interested in searching for patients whose records contain certain search terms. Users often desire to compose a query that will identify instances of a model entity (e.g., a patient) with certain attributes or with data that contains certain search terms (e.g., patients with data referencing melanoma). Moreover, to users interacting with a database application, the collection of data that makes a patient compelling is the totality of information captured about them, regardless of where or how it is stored within physical tables in the system.

Thus, a user's logical view of data (as entities and attributes) is often disconnected from the physical mechanisms used to store data (tables, rows, and columns). Accordingly, there is a need for database query techniques that do not force users to view data according to the physical mechanisms used to store data. Query techniques should provide users with the ability to query a central entity or concept using a set of search terms, and users should be presented with query results that conform to a logical view or understanding of data.

SUMMARY OF THE INVENTION

The present invention generally provides methods systems, and articles of manufacture for constructing a database abstraction model over an underlying physical database. Once constructed, users may interact with the database abstraction model to search, retrieve, add, or modify data in the underlying database. The database abstraction model provides an interface that presents users with a logical view of data stored in the underlying database.

One embodiment of the invention provides method of providing access to data in a database. The method generally includes, receiving, from a requesting entity, a search request for data available through a database abstraction model, wherein the database abstraction model provides (i) a plurality of logical fields each specifying an access method for accessing data in the database, and (ii) at least one model entity that specifies an identifier in the database used to identify instances of the model entity, and further specifies a set of the logical fields used to access data related to the model entity, and wherein the search request specifies the model entity to be searched and at least one search term. The method generally further includes, accessing, for each instance of the model entity in the database, data for each of the logical fields in the set of logical fields related to the model entity that are candidates for containing data matching the at least one search term, identifying, for each instance, whether the accessed data contains the at least one search term, and if so, adding the identifier for the specific instance of the model entity to a set of search results, and returning the search results to the requesting entity.

Another embodiment of the invention provides a computer a computer-readable medium, containing a program which, when executed on a processor performs operations for providing access to data in a database. The operations of the program generally include, receiving, from a requesting entity, a search request for data available through a database abstraction model, wherein the database abstraction model provides (i) a plurality of logical fields each specifying an access method for accessing data in the database, and (ii) at least one model entity that specifies an identifier in the database used to identify instances of the model entity, and further specifies a set of the logical fields used to access data related to the model entity, and wherein the search request specifies the model entity to be searched and at least one search term. The operations of the program generally further include accessing, for each instance of the model entity in the database, data for each of the logical fields in the set of logical fields related to the model entity that are candidates for containing data matching the at least one search term, identifying, for each instance, whether the accessed data contains the at least one search term, and if so, adding the identifier for the specific instance of the model entity to a set of search results, and returning the search results to the requesting entity.

Another embodiment of the invention provides a system for a database abstraction model constructed over of a physical database. The system generally includes, the physical database, and the database abstraction model, wherein the database abstraction model provides (i) a plurality of logical fields each specifying an access method for accessing data in the physical database, and (ii) at least one model entity that specifies an identifier in the physical database used to identify instances of the model entity, and further specifies a set of the logical fields used to access data in the physical database related to the model entity. The system generally further includes a runtime component configured to receive a search request that specifies the model entity to be searched and at least one search term, and, in response, to identify instances of the model entity specified in the search request for which at least one logical field maps to data for the instance of the model entity that contains the search term.

BRIEF DESCRIPTION OF THE DRAWINGS

So that the manner in which the above recited features, advantages and objects of the present invention are attained and can be understood in detail, a more particular description of the invention, briefly summarized above, may be had by reference to embodiments thereof, which are illustrated in the appended drawings.

The appended drawings, however, illustrate only typical embodiments of the invention and, therefore, should not be considered limiting of its scope, for the invention may admit to other equally effective embodiments.

FIG. 3A-3C illustrate a relational database schema (FIG. 3A), a database abstraction model created for this relational database (FIG. 3C), and a model entity view of the database (FIG. 3B), according to one embodiment of the invention.

DETAILED DESCRIPTION OF THE PREFERRED EMBODIMENTS

Figure 1:
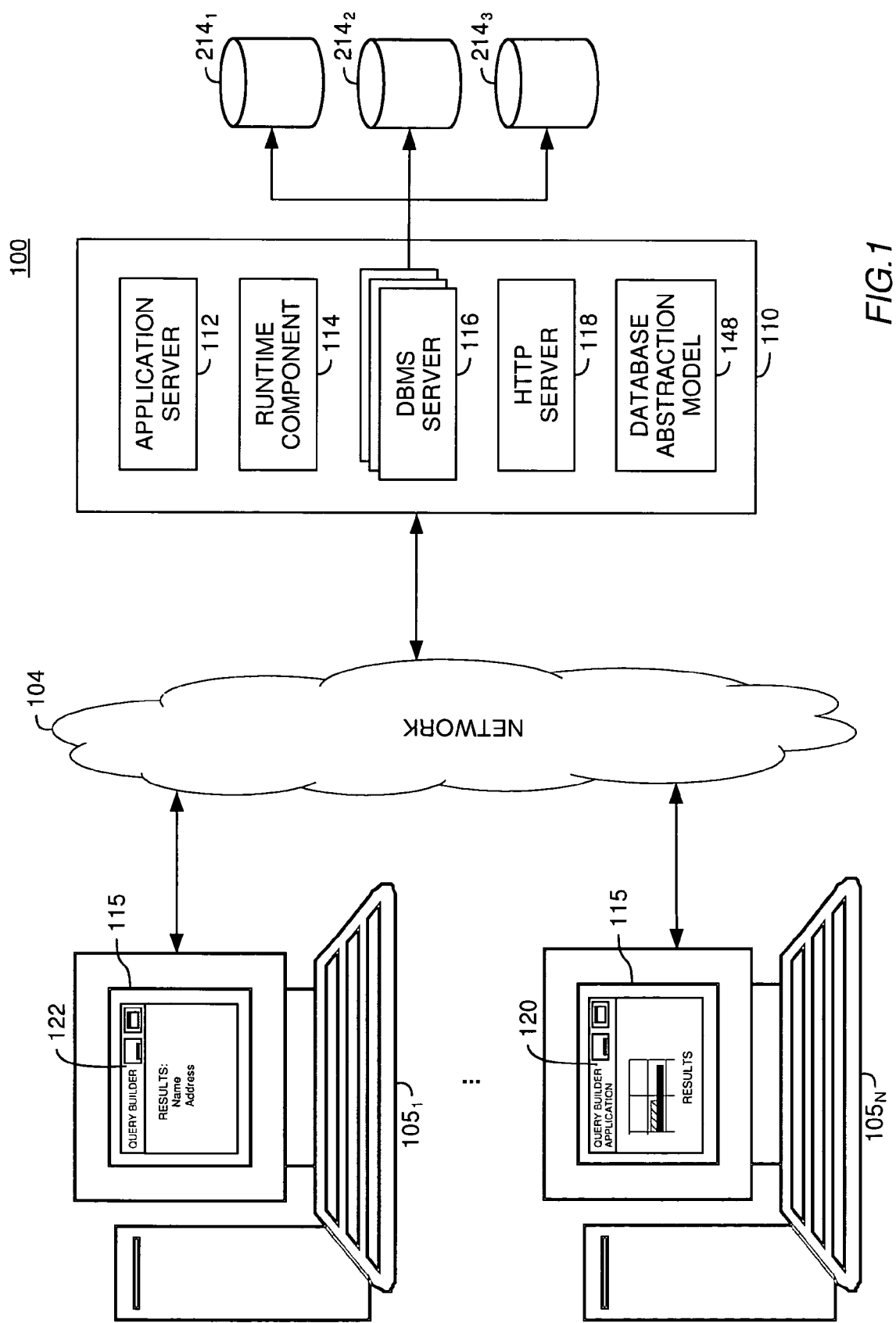
FIG. 1 illustrates a relational view of software and hardware components, according to one embodiment of the invention.

Commonly assigned U.S. patent application Ser. No. 10/083,075 (the '075 application) entitled "Application Portability and Extensibility through Database Schema and Query Abstraction", discloses a framework for constructing a database abstraction model over a physical data storage mechanism. The framework of the '075 application provides a requesting entity (i.e., an end-user or front-end application) with an abstract representation of data stored in an underlying physical storage mechanism, such as a relational database.

Once a database abstraction model is constructed over an underlying physical database, users may interact with the database abstraction model, rather than the underlying physical database. Embodiments of the present invention extend the techniques disclosed by the '075 application to allow users to initiate a context insensitive search to identify instances of a model entity that contain a specified search term. For example, a user may which to query about patients using the following:

<Find all patients with records that include the term "melanoma">

In one embodiment, the database abstraction model provides a set of model entities, each related to a central entity or concept that a user may be interested in searching. Examples of model entities include patients, doctors, employees, specimens, etc. More generally, a model entity identifies the logical focus, or the central entity, being queried by a user interacting with a query application. Model entities are described in detail in a commonly assigned U.S. patent application Ser. No. 10/403,356, filed Mar. 31, 2003, entitled "Dealing with Composite Data through Data Model Entities," incorporated herein by reference in its entirety.

The database abstraction model exposes data from the underlying physical database using a plurality of logical fields. Logical fields provide a logical view of the data about a model entity that is available in the underlying physical database. Data for a particular logical field is retrieved using an access method specified in the database abstraction model. Access methods map a logical field to a physical location in the underlying database. Additionally, an abstract record is used to identify what logical fields about each model entity are available to query using the database abstraction model. That is, the model entity specifies a "thing" for a user to query, and an abstract record specifies what data about the "thing" exists in the underlying database. In one embodiment, the abstract record identifies a hierarchy of logical fields that map to data related to the model entity. At the root of the hierarchy is the logical field that maps to an identifier in the database used to identify instances of the model entity. Abstract records are further described in a commonly assigned, U.S. patent application, entitled "Abstract Records", filed herewith, incorporated herein by reference in its entirety.

Additionally, embodiments of the present invention allow users to search for instances of a model entity that include certain data or certain search terms. For example, users may specify to search for instances of a "patient" model entity that contain references to "melanoma," regardless of where the reference occurs in the abstract record for a particular instance of the "patient" model entity. Oftentimes, the search criteria may include term-based searches; however, other criteria may be used. For example, model entities might be searched for dates, image content, or synonyms and related terms for the provided search terms. In response to a search request, embodiments of the invention may be configured to identify and return instances of the model entity that contain the search term somewhere in the abstract record for the returned instances.

The following description references embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims except where explicitly recited in a claim. Similarly, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Database Abstraction Model: Physical View of the Environment

FIG. 1 illustrates a networked computer system in a client/server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected via a bus, to memory and storage (not shown). Each client system 105 is running an operating system that manages the interaction between hardware components and higher-level software applications running on client system 105. (e.g., a Linux® distribution, Microsoft Windows®, IBM's AIX® or OS/400®, FreeBSD, and the like may be used) (Linux is a trademark of Linus Torvalds in the US, other countries, or both.)

The server system 110 may include hardware components similar to those used by client system 105. Accordingly, the server system 110 generally includes a CPU, a memory, and a storage device, coupled to one another by a bus (not shown). The server system 110 is also running an operating system, (e.g., a Linux® distribution, Microsoft Windows®, IBM's OS/400® or AIX®, FreeBSD, and the like) that manages the interaction between hardware components and higher-level software applications.

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although described using a client/server configuration, embodiments using distributed, grid, and peer-to-peer computing techniques are contemplated.

In one embodiment, users interact with the server system 110 using a graphical user interface (GUI) provided by interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests.

Alternatively, or in addition, client application 120 may comprise a database front-end, or query application program running on client system $105_N$. The application 120 may allow a user to compose an abstract query and to submit the abstract query for processing to the runtime component 114. Application 120 or browser 122 presents a user with query-building interface 115. Query building interface 115 provides an interface for a user to interact with the database abstraction model environment to compose queries, view results, etc.

As illustrated in FIG. 1, server system 110 may further include runtime component 114, DBMS server 116, and database abstraction model 148. Each of these components may be a software program executing on the server system 110. The DBMS server 116 generally comprises a software application configured to manage databases $214_{1-3}$. Runtime component 114 is configured to generate a query consistent with the physical representation of the data contained in one or more of the databases 214. In other words, the runtime component 114 is the "transformational engine" that maps between the logical view provided by the database abstraction model 148 and the physical view of the underlying database systems. In one embodiment, the runtime component is configured to generate a physical query (e.g., an SQL statement) from an abstract query. The runtime component 114 may be configured to use the access method defined for a logical field to generate a physical query of the underlying physical database. The runtime component 114 may also be configured to return query results to the requesting entity, (e.g., using HTTP server 118).

Database Abstraction Model: Logical View of the Environment

Figure 2:
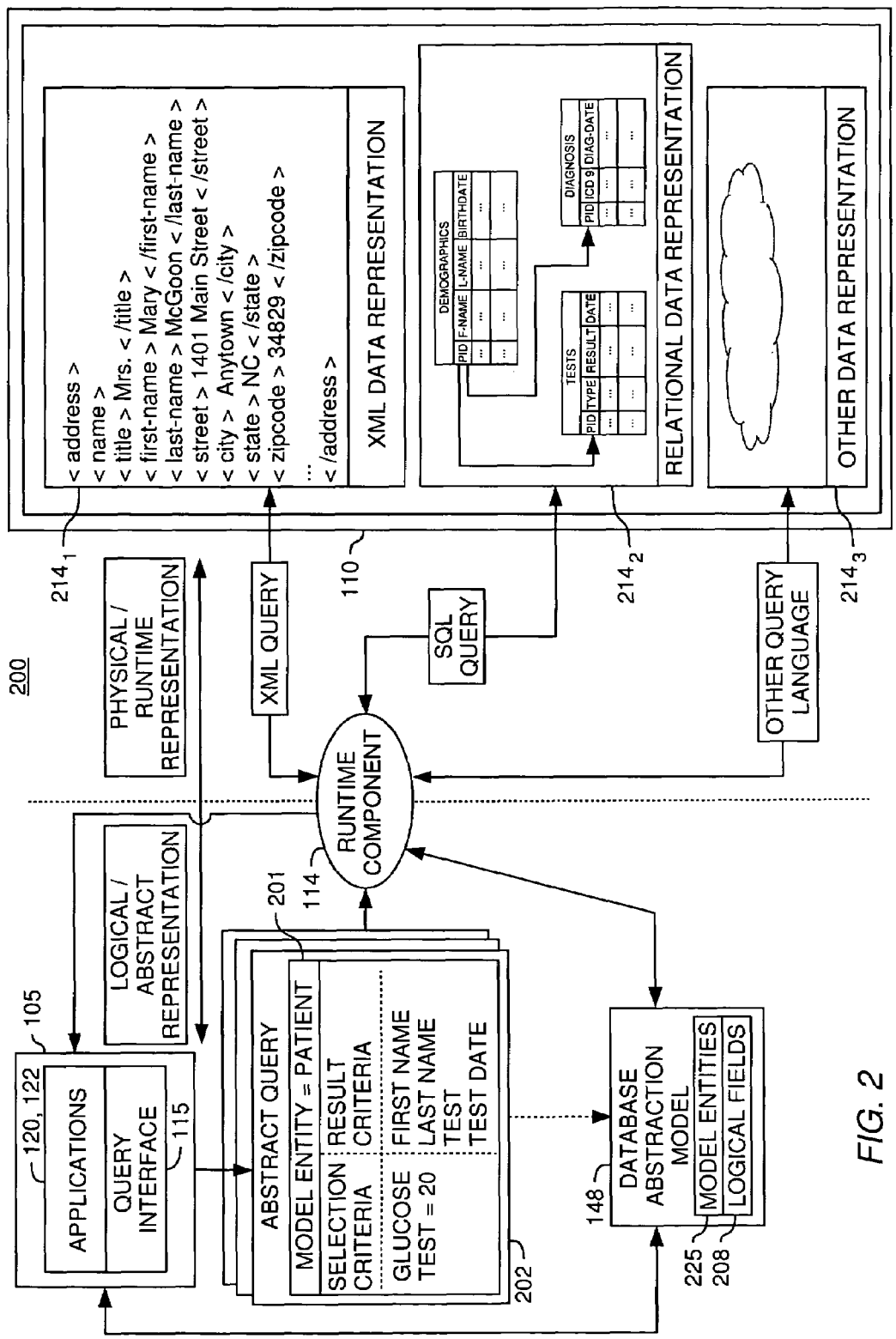
FIG. 2 illustrates a logical and physical representation of the database abstraction model environment, according to one embodiment of the invention.

FIG. 2 illustrates a plurality of interrelated components of the invention, along with the relationship between the logical view of data provided by the database abstraction model environment (the left side of FIG. 2), and the underlying physical environment used to store the data (the right side of FIG. 2). In one embodiment, the database abstraction model 148 provides a set of model entities 222 and logical fields 208.

In one embodiment, a requesting entity (e.g., a user interacting with application 115 executing on client system 105) composes an abstract query 202 using query building interface 115. The abstract query 202 includes an indication of the model entity being queried 201, along with selection and results criteria. The resulting query is generally referred to herein as an "abstract query" because it is composed using logical fields 208 rather than by direct references to data entities in underlying databases $214_{1-3}$. Also, the query building interface 115 may be configured to provide users with the ability to search for instances of a selected model entity using specified search terms. Thus, rather than query an increasingly specific collection of tables, columns, and rows, users interact with query interface 115 to compose, or search, for instances of a model entity.

In one embodiment, the logical fields 208 are defined by the database abstraction model 148. Each logical field 208 may specify an access method used by the runtime component 114 to retrieve data from the underlying physical database 214. In other words, the access method provides a mapping between the logical view of data exposed to a user interacting with the interface 115 and the physical view of data needed by the runtime component 114 to retrieve data from the physical databases 214. Depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

The following discussion illustrates a database abstraction model 148 constructed over an exemplary relational database (e.g., database $214_2$). The database abstraction model 148 includes a "patient" model entity and a plurality of logical fields used to access data related to the "patient." Once constructed, methods for searching the abstract record associated with instances of the "patent" model entity are described.

Figure 3A:
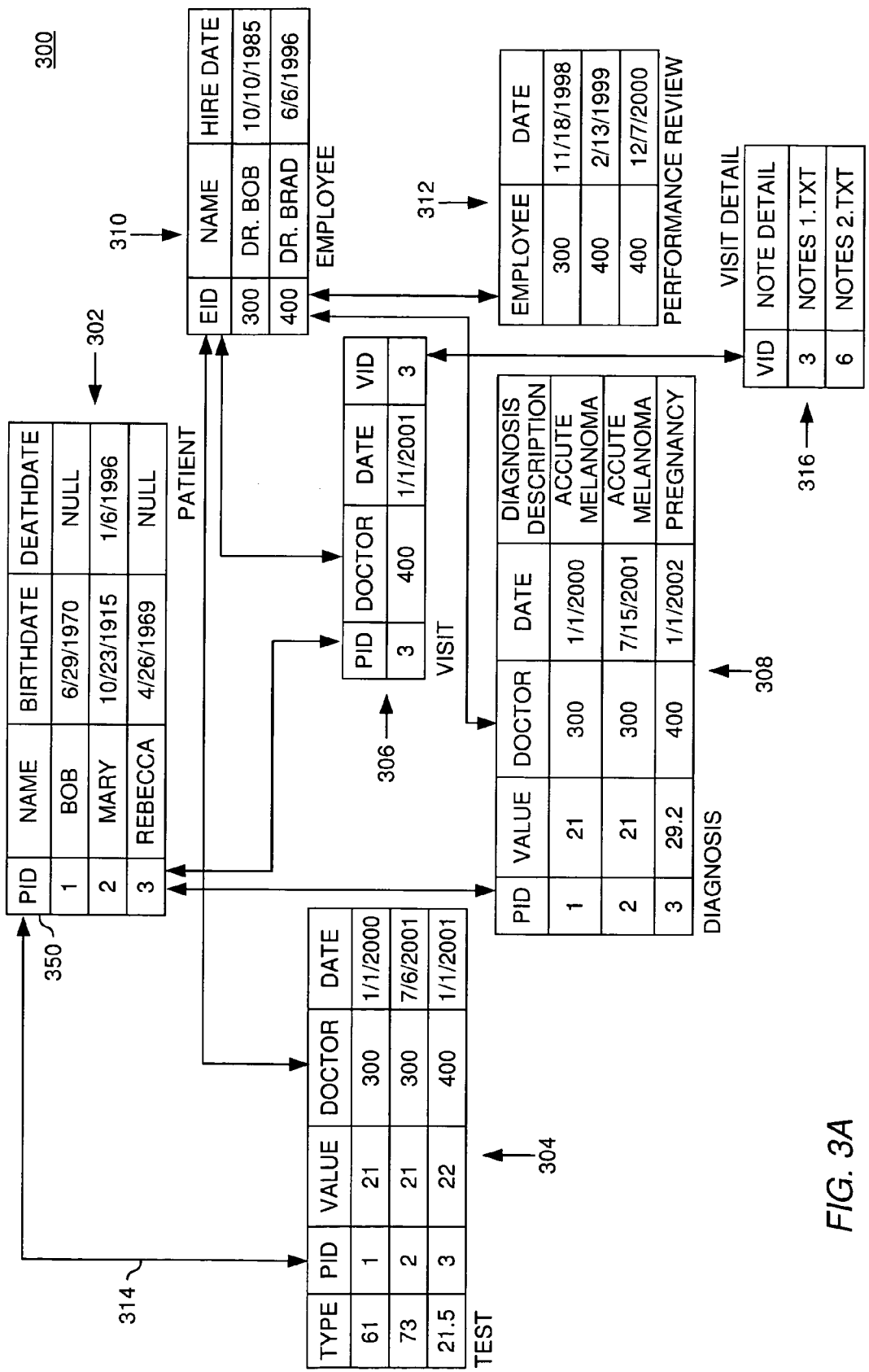

FIG. 3A illustrates an exemplary relational database 300. As illustrated, database 300 includes a group of relational tables and also specifies the relationships between the tables. Each table is used to store data related to both patients and employees. For example, patients table 302 includes a patient identifier (PID) column used to identify each individual patient, and also includes additional columns that store data about each patient. Specifically, patients table 302 includes a name, a birthdate, a death date, and an employee ID column. Similarly, employee table 310 contains an employee identifier (EID) and related columns. Also illustrated are tests table 304, visit table 306, diagnosis table 308, performance review table 312, and visit detail table 316.

Lines connecting the columns of two tables indicate a relationship between the two tables. For example, the PID column in patients table 302 is related to the PID column in the tests table 304. That is, if a PID value is the same in both columns, then data from the rows of each table correspond to the same patient. Line 314 indicates this relationship. Relationships between the columns of other tables in database 300 are similarly illustrated. Those skilled in the art will recognize that line 314 (along with the other lines connecting tables in FIG. 300) illustrate the primary and foreign key relationships for relational database 300.

Database Abstraction Model: Model Entities

Figure 3B:
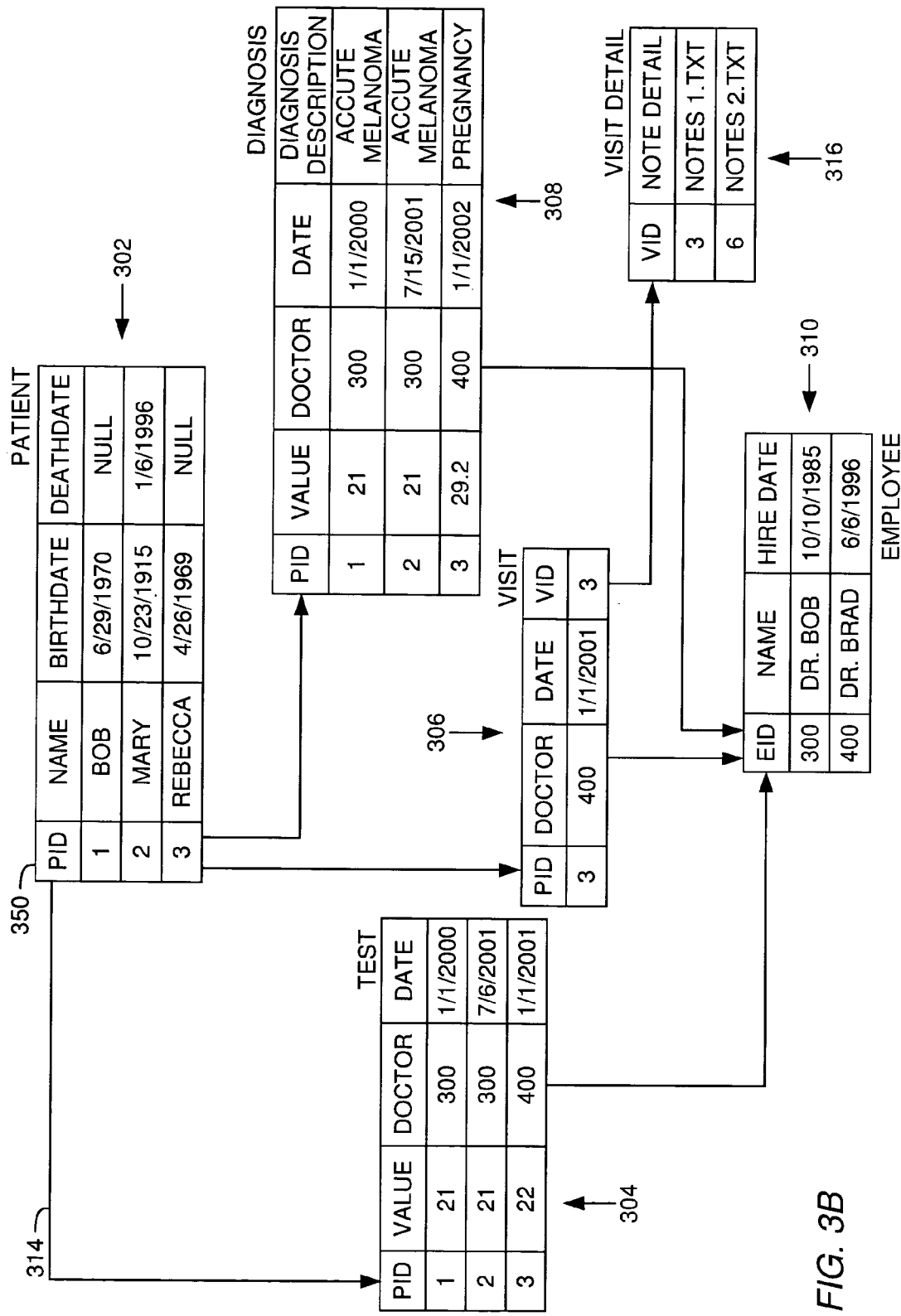

FIG. 3B illustrates the tables, and relationships between tables, in database 300 used to define a "patient" model entity. In one embodiment, instances of a model entity may be identified using an identifier (e.g., a primary key value of a relational table) in the underlying physical database. Each instance of the identifier in the underlying database corresponds to an instance of the model entity. As illustrated, the PID column 350 of table 302 is used as the identifier for the "patient" model entity. Table 302 may also be referred to herein as the model entity table. The PID identifier distinguishes instances of the "patient" model entity. Extending out from the "patient" table 302 are relationships to other tables in database 300 that contain data related to the "patient" model entity.

Not all of the tables in database 300 are included in FIG. 3B. For example, the performance review table 312 is not included. Only the tables that are "visible" to the "patient" model entity are illustrated. For example, a patient may have data in the diagnosis table 308. Accordingly, this table is illustrated in FIG. 3B with a relationship from the model entity table 302 to the diagnosis table 308. Patients do not, however, have any data stored in the performance review table 312, and accordingly, this table is not "visible" to the "patient" model entity. As a consequence, the patient model entity may not be queried to retrieve data from performance review table 312, and a context insensitive model entity search will not identify instances of the "patient" model entity based on data from performance review table 312.

FIG. 3C illustrates a database abstraction model 148 constructed over relational database 300 that includes the patient model entity illustrated in FIG. 3B. In one embodiment, the database abstraction model 148 defines model entities 225 and logical fields 208. Model entity section 225 includes a definition for the "patient" model entity. As illustrated, the "patient" model entity includes the identifier 222 used to distinguish instances of the model entity, and relationships 224. Each model entity relationship specifies a relationship between two tables in the database 300. Collectively, the "patient" model entity relationships specify all of the tables in database 300 that contain data related to the "patient" model entity, and the structure of these relationships.

For example, a patient may have data in the diagnosis table. Thus, the model entity relationship "Patient.pid (1)→Diagnosis.pid (many)" is included in the "patient" model entity relationships 225. In addition, each model entity relationship may indicate whether the relationship between the tables is a one-to-one or one-to-many relationship. For example, each relationship 224 includes a (1) or (many) indicator for the two database columns.

As illustrated by the arrows in relationships 224, and the arrows in the table relationships in FIG. 3B, model entity relationships are directional. Model entity relationships flow from the model entity table to other tables in the database. Thus, model entity relationships form a directed hierarchy with the model entity table at the top (or root) of the hierarchy. For example, each instance of the "patient model" entity may have many diagnoses (stored in the diagnosis table 308), each one made by a different doctor (stored in the employee table 310). The converse, however, does not hold. For example, doctors do not have a diagnosis, and a diagnosis does not have a patient.

Stated another way, the "patient" model entity is queried to find diagnoses, not the other way around. A "diagnosis" model entity, however, could include such a relationship. To further illustrate this aspect, consider the one-to-many nature of the two model entities. An instance of the "patient" model entity includes one patient that may have many diagnoses. A "diagnosis" model entity would provide one diagnosis related to many patients (e.g., all of the patients diagnosed with condition X). Thus, model entity relationships 224 not only identify what data is available for the model entity in database 300, they describe the hierarchy of data available in database 300 relative to the model entity.

Database Abstraction Model: Logical Fields

FIG. 3C also illustrates a plurality of logical field specifications $208_{1-5}$ (five shown by way of example). The logical fields 208 are defined to map to data related to the "patient" model entity. The access methods 210 map the logical fields 208 to tables and columns in database 300. As illustrated, each field specification 208 identifies a logical field name $210_{1-5}$ and an associated access method $212_{1-5}$. Depending upon the number of different types of logical fields, any number of access methods is contemplated. FIG. 3C illustrates access methods for simple fields, filtered fields, and composed fields.

Field specifications $208_1$ and $208_2$ each provide a simple access method $212_1$ and $212_2$, respectively. A simple access method specifies a direct mapping to an entity in the underlying physical database. For a relational database, the simple access method maps the logical field to a specific database table and column. For example, the simple field access method $212_1$ maps the logical field name $210_1$ "Patient ID" to the PID column 250 in a table patients table 302. As described above, this field is the model entity field for the "patient" model entity. Accordingly, the "Patient ID" logical field maps to the identifier used to distinguish different instances of the "patient" model entity. Logical field $208_2$ includes access method $210_2$ maps to the name of the individual represented by an instance of the model entity.

Field specifications $208_{3-4}$ exemplify a filtered field access method $212_{3-4}$. Filtered access methods identify an associated physical entity and provide rules used to select a subset of data from the physical entity. Consider, for example, a relational table storing test results for a plurality of different medical tests. Logical fields corresponding to each different test may be defined, and a filter for each different test is associates a particular test with a logical field. For example, the access method for filtered field $212_3$ maps to the "value" column of tests table 304 and defines a filter $214_1$ of "Test_ID='45.' Accordingly, the filtered fields $208_{3-4}$ act as selection criteria that select a subset of data from a larger set (e.g., value column of table 304), without the user having to know the specifics of how the data is represented in the underlying physical database or having to specify the selection criteria as part of the query building process. Logical field $208_4$ includes access method $210_4$ used to access a set of test results for the test specified by filter $214_2$.

Field specification $208_5$ exemplifies a composed access method $212_5$. Composed access methods generate a return value by retrieving data from the underlying physical database, and performing operations on the data. In this way, information that does not directly exist in the underlying data representation may be computed and provided to a requesting entity. For example, composed field access method $212_5$ maps the logical field "Age" $210_5$ to a "birthdate" logical field (not shown). The "Age" value returned for this logical field $210_5$ is computed by retrieving data from the underlying database using the "birthdate" logical field, and subtracting a current date value from the birthdate value.

By way of example, the field specifications 208 of the data repository abstraction component 148 shown in FIG. 3C are representative of logical fields mapped to data represented in the relational data representation 300. However, other instances of the data repository abstraction component 148 or other logical field specifications may map to other physical data representations (e.g., databases $214_1$ or $214_3$ illustrated in FIG. 2).

Database Abstraction Model: Abstract Records

In one embodiment, logical fields 208 with access methods that map to the columns of tables specified by the model entity relationships are defined. For example, the "patient" model entity relationships 225 reference the patients table 302, the tests table 304, the visit table 306, the diagnosis table 308, the employee table 310, and the visit detail table 316. Accordingly, logical fields 208 are defined that map to the columns of these tables. Together, the collection of logical fields created for a model entity form an abstract record. Generally, an abstract record identifies the scope of data about a model entity that may be queried by users of the database abstraction model 148 using logical fields 208. Further, structure of the abstract record forms a hierarchy that mirrors the hierarchy of the model entity relationships 225. Detailed examples of abstract records are described in a commonly assigned, U.S. patent application, entitled "Abstract Records," filed herewith.

Figure 4:
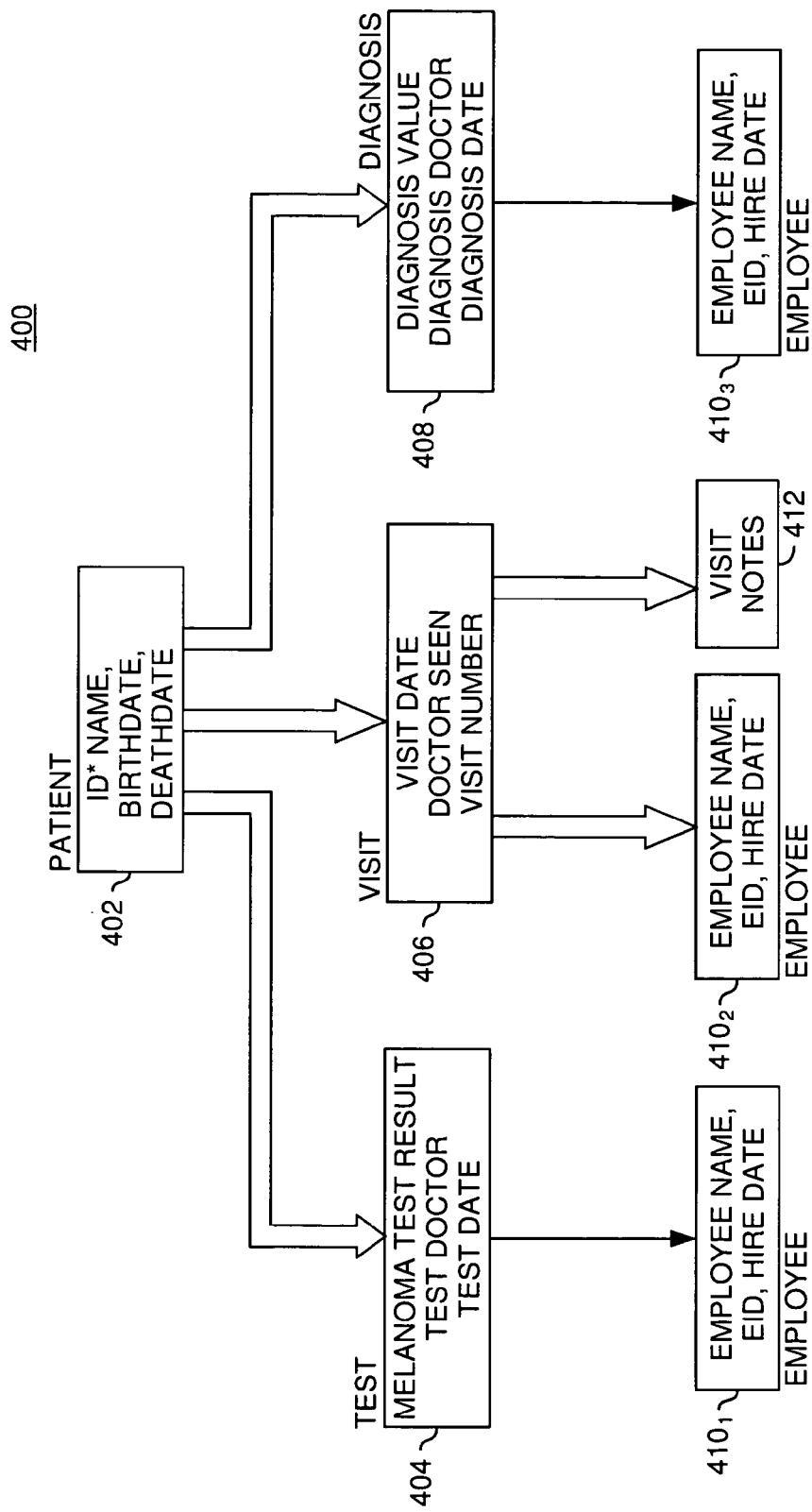
FIG. 4 illustrates a graphical representation of an abstract record, according to one embodiment of the invention.

FIG. 4 illustrates a graphical representation of an abstract record 400 for the "patient" model entity. In this illustration, abstract record 400 is represented as a hierarchy of nodes. In one embodiment, each node is related to a table specified in the model entity relationships 225 illustrated FIG. 3B and FIG. 3C. Each node identifies logical fields mapping to columns in the table represented by the node. For example, at the root of abstract record 400 is the "patient" node 402. Node 402 includes the model entity logical field "Patient ID," and also includes logical fields that map to columns of the patients table 302. Thus, logical fields "PID," "name," "EID," "birthdate," and "death date," are included in data abstraction model 148. Extending from the model entity node 402 are branches to other nodes that identify the logical fields related to the model entity. "Test" node 404 includes logical fields for "melanoma test," "test doctor," and "Test date." (Nodes for other tests available in test table 304 may be similarly defined using a co-equal node for each filtered field). Similarly, "diagnosis" node 408 includes logical fields for a "diagnosis value," "diagnosis date," and a "diagnosis doctor" (i.e., the doctor making the related diagnosis). "Visit" node 406 includes logical fields "visit," "date," and "treating doctor." Branching from "visit" node 406 is "visit notes" node 412.

As illustrated, the branches from the "patient" node 402 to nodes 404, 406, and 408, are all represented with a double line segment indicating a one-to-many relationship between the nodes connected by a branch. Further down in the hierarchy are one-to-one relationships (represented using a single line segment) from "test" node 404, "visit" node 406, and "diagnosis" node 408 to copies of the "employee" node 410. The "employee" node includes the logical fields of "employee name," "employee identifier," and a "hire date" logical field that map to the employee table 310.

Although illustrated three times, the logical fields for the three nodes $410_{1-3}$ map to data in the employee table 310. The "employee" node is replicated, however, because the model entity relationships refer to the employee table in more than one relationship. For example, an instance of the patient model entity may have multiple diagnoses where each diagnosis is made by a doctor. Data about the doctor making each diagnosis is available from the employee table. Node $410_1$ of the abstract record 400 identifies what logical fields are used to obtain this data. At the same time, a patient may have data related to multiple hospital visits where data for each visit includes a treating doctor. Data about the treating doctor is also available (also from the employee table 310). Node $410_2$ of the abstract record identifies what logical fields are used to obtain this data. Thus, the replicated nodes separate data related to a diagnosis from data related to a visit.

Figure 5:
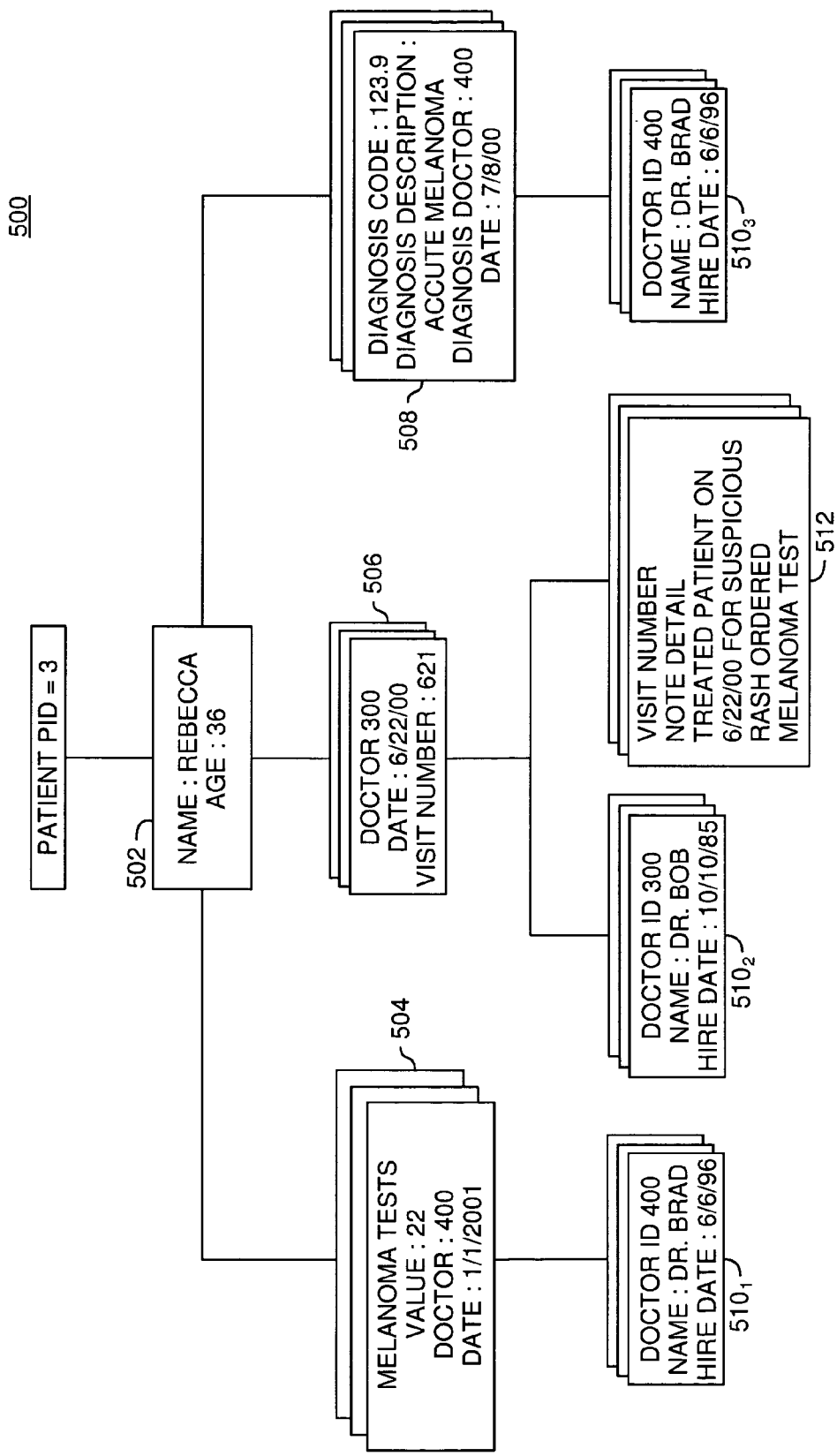
FIG. 5 illustrates a graphical representation of an abstract record, according to one embodiment of the invention.

As described above, the logical field that maps to the identifier for a model entity may be placed at the root of an abstract record. The abstract record, in turn, specifies the logical fields that map to data related to the model entity, as well as the relationships between logical fields, relative to the model entity. Using the example model entity "patients," each instance of the model entity represents a particular patient. And the abstract record for an instance of the model entity contains all of the data related to that patient. FIG. 5 illustrates abstract record 500 for a specific patient with a "PID" value of "3." Each node of the abstract record 500 is populated with the data retrieved using the logical fields identified for the node in FIG. 4. Thus, "test" node 404 contains data retrieved using the logical fields specified in abstract record node 404 related to melanoma test results for the "PID=3" instance of the "patient" model entity. Other nodes are similarly populated using data retrieved using the logical fields in abstract record 400.

Database Abstraction Model: Abstract Queries and Model Entity Searching

In one embodiment, a user may specify a model entity, or compose a query, to identify instances of a model entity. Once a specific model entity is selected, runtime component 114 may be configured to retrieve data related to the instance of the model entity from the underlying database using the access methods specified for each logical field. In one embodiment, the runtime component may retrieve the entire abstract record for a particular model entity. Alternatively, a user may request to view only a portion of the abstract record for a selected instance of a model entity. Also, embodiments of the invention provide for a user to simply query the database abstraction model to search for instances of the model entity that contain a specified search term, regardless of the location of the term within the abstract record. The search request may be referred to herein as a context insensitive search.

Figure 6:
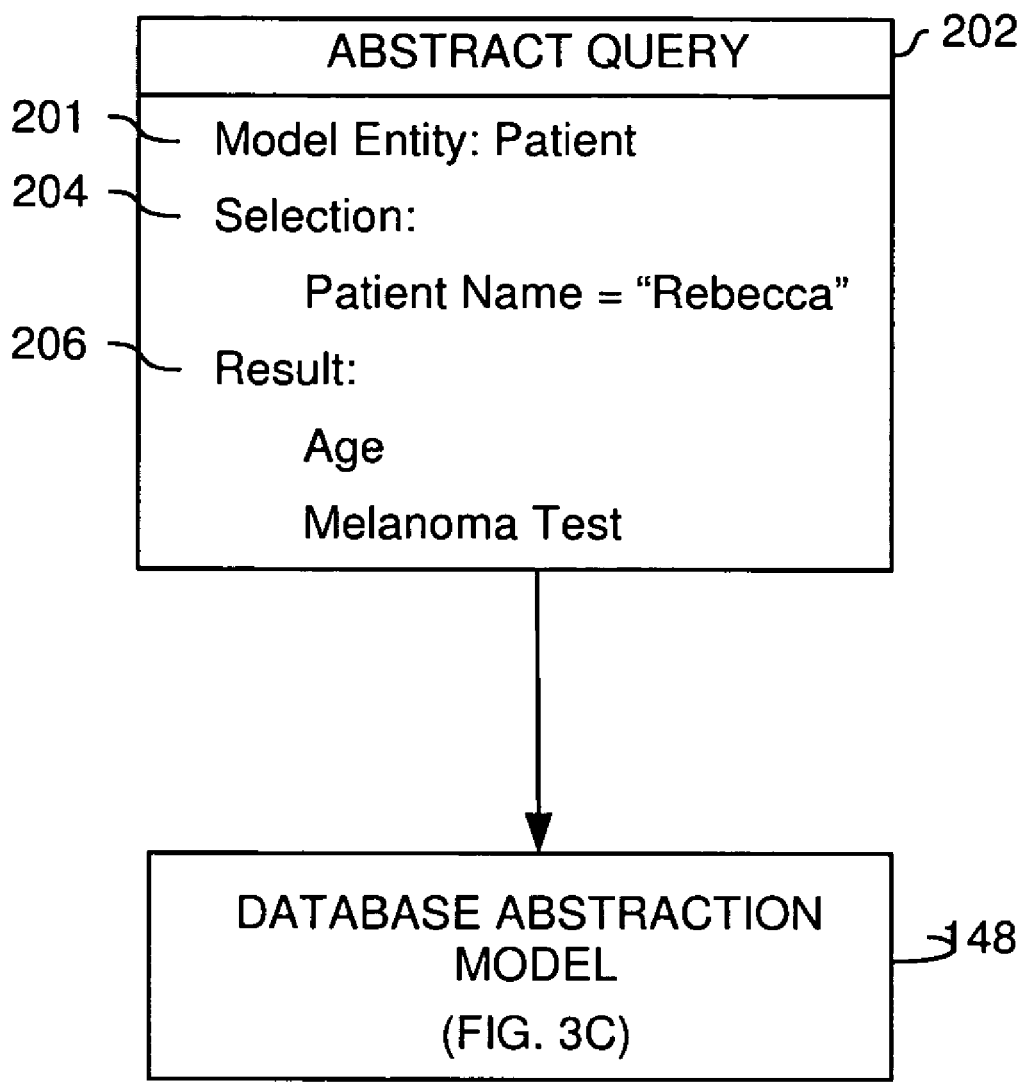
FIG. 6 illustrates an abstract query of a "patient" model entity composed from logical fields provided by the database abstraction model, according to one embodiment of the invention.

FIG. 6 illustrates an exemplary abstract query 202. The query includes selection criteria 204 designed to retrieve information about a patient named "Mary McGoon." The particular information retrieved for abstract query 202 is specified by result criteria 206. In this case, the query retrieves the age and the test results for a melanoma test. The actual data retrieved may include data from multiple tests. That is, the query results may exhibit a one-to-many relationship between the named patient and the test results (as indicated by the abstract record for patients 400 and by model entity relationships 224).

An illustrative abstract query corresponding to abstract query 202 is shown in Table I below. In this example, the abstract query 202 is represented using extensible markup language (XML). In one embodiment, application 115 may be configured to generate an XML document to represent an abstract query composed by a user interacting with the query building interface 115. Those skilled in the art will recognize that XML is a well known markup language designed to facilitate the sharing of structured text and information, other markup languages, however, may be used.

TABLE I

| Query Example |
|---|
| 001 <?xml version="1.0"?> |
| 002 <!--Query string representation: (FirstName = "Mary" AND |
| 003 LastName = "McGoon") OR State = "NC"--> |
| 004 <QueryAbstraction> |
| 005   <Selection> |
| 006     <Condition internalID="4"> |
| 007       <Condition field="FirstName" operator="EQ" value="Mary" |
| 008 internalID="1"/> |
| 009       <Condition field="LastName" operator="EQ" |
|         value="McGoon" |
| 010 internalID="3" relOperator="AND"></Condition> |
| 011     </Condition> |
| 012   </Selection> |
| 013   <Results> |
| 014     <Field name="Age"/> |
| 015     <Field name="melanoma test"/> |
| 016   </Results> |
| 017   <Entity name="patient" > |
| 018     <FieldRef name="data://patient/PID" /> |
| 019     <Usage type="query" /> |
| 020   </EntityField> |
| 021   </Entity> |
| 023 </QueryAbstraction> |

The abstract query shown in Table I includes a selection specification (lines 005-012) containing selection criteria and a results specification (lines 013-016). In one embodiment, a selection criterion consists of a field name (for a logical field), a comparison operator (=, >, <, etc) and a value expression (what the field is being compared to). In one embodiment, the result specification is a list of logical fields used to access query results data. The actual data returned is consistent with the selection criteria. Line 17 identifies the model entity for the abstract query, in this case, a "patient" model entity. Thus, query results return instances of patients. Line 18 provides the identifier in the underlying database used to identify instances of the model entity. In this case, instances of the "patient" model entity are identified using values from the "Patient ID" column of patient table 302.

Once an abstract query is composed using interface 115, a user submits the abstract query to the runtime component 114 which process the abstract query and returns a set of query results. In one embodiment, the runtime component 114 receives the abstract query and, in response, generates an intermediate representation of the abstract query, such as an abstract query plan. This intermediate representation is used to generate a physical query of the underlying physical database. Abstract query plans and query processing are further described in a commonly assigned, co-pending application entitled "Abstract Query Plan," Ser. No. 11/005,418, filed Dec. 6, 2004, which is incorporated by reference herein in its entirety.

In addition to providing users with the ability to construct a query using the logical fields defined for a model entity, embodiments of the invention provide for context insensitive model entity searching. Typically, an abstract query provides a context sensitive search, i.e., queries are composed that tend to isolate increasingly specific data by adding additional logical fields and conditions to an abstract query. In contrast, a context insensitive search begins with a selected model entity and engages in an increasingly broad search for instances of the model entity that include the specified search terms.

Figure 7A:
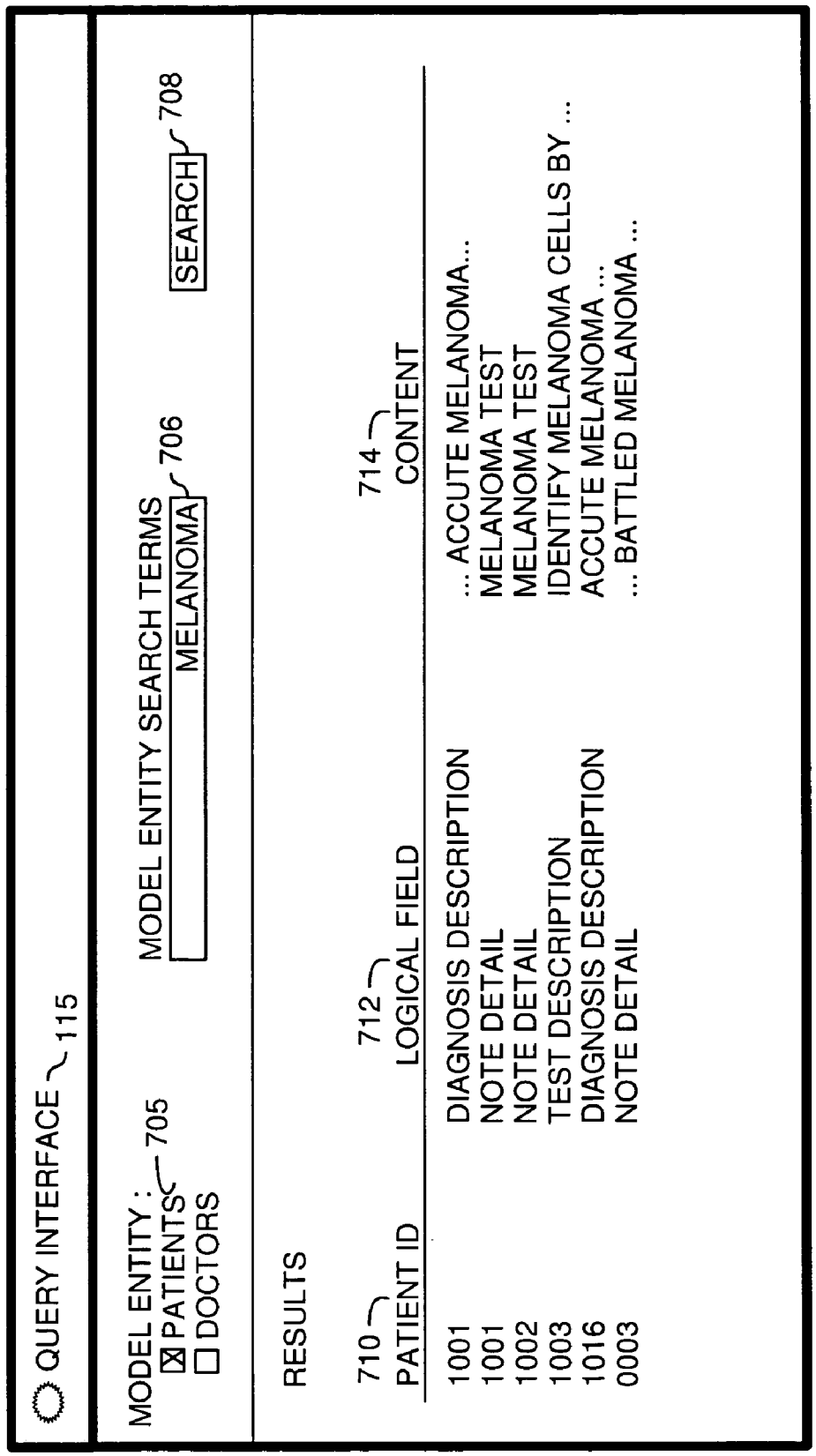
FIGS. 7A-7B illustrate exemplary graphical user interface screens, according to one embodiment of the invention.

In one embodiment, query building interface 115 includes graphical interface controls for composing a context insensitive model entity search. FIG. 7A illustrates an exemplary graphical user interface screen 700 for composing a context insensitive model entity search. As illustrated, screen 700 includes a search section 702 and a results section 704. The search section 702 indicates what model entity is currently being searched in check box 705. As illustrated, a user interacting with interface 115 has specified to search for instances of the "patient" model entity. Once the model entity is selected, search terms may be entered into text box 706. A user initiates a context insensitive model entity search using button 708.

Results section 704 illustrates model entity search results for the search criteria "melanoma" illustrated in box 706. As illustrated search results include instances of the "patient" model entity that include the search term. Thus, patient IDs 710 represent each patient in the underlying database 300 that included the search term "melanoma" somewhere in the abstract record for that particular patient. In addition, the interface 115 may be configured to display both the logical field and actual data from the database 300. For example, the first row of results 710 indicates that for the "Patient ID=1001" instance of the "patient" model entity, the logical field "Diag_desc" mapped to data in database 300 with the content 714 "of . . . Acute melanoma . . . " The other rows of results 710 illustrate similar information for other instances of the "patient" model entity.

Figure 7B:
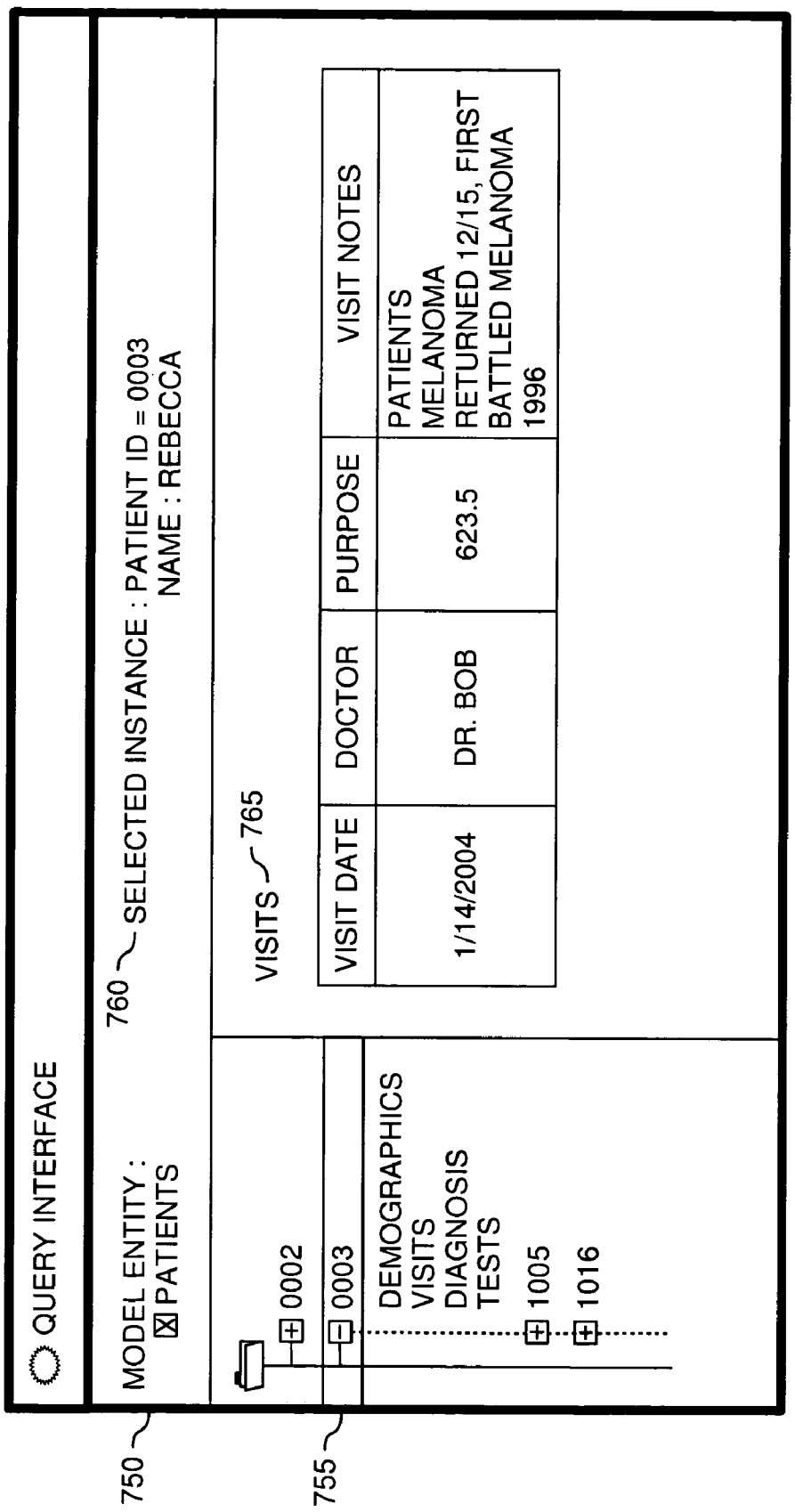

By presenting search results as instances of the model entity, users may then interact with the complete abstract record for each identified instance. For example, a graphical interface screen 750 illustrated in FIG. 7B displays the abstract record for the "PID=3" instance of the "patient" model entity (first illustrated in FIG. 5). In one embodiment, the instances of the model entity may be displayed as hyperlinks configured to display the full abstract record for a particular patient when clicked. At the root of the abstract record hierarchy is the PID value "3." In this illustration, a user has selected to view data from the "visits" node of the abstract record. Thus, a display area 765 presents a user with data from the logical fields for this portion of the abstract record. Interacting with hierarchy display 755, a user may navigate through the hierarchy for this patient, and for other instances of the patient model entity currently being displayed using screen 750.

Figure 8:
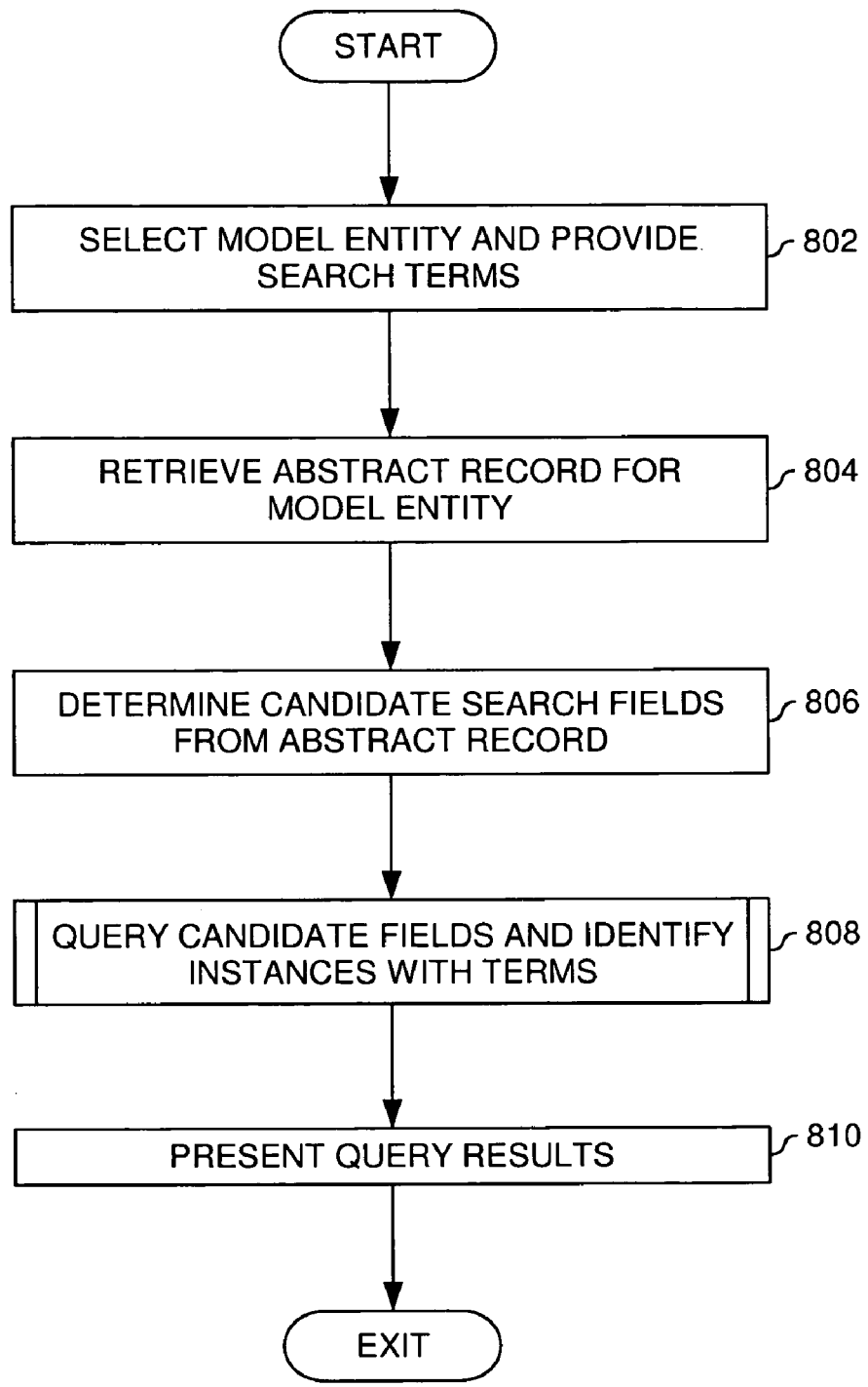
FIG. 8 illustrates a method to search for instances of a model entity defined by a database abstraction model, according to one embodiment of the invention.

FIG. 8 illustrates a method 800 for a context insensitive search used to identify instances of a model entity using search terms, according to one embodiment of the invention. The method begins at step 802 where a model entity is selected and search terms are provided. In one embodiment, a user interacts with interface 115 to select what model entity to search. For example, check box 705 and text box 706 (in FIG. 7A) may be provided for a user to input a model entity selection and search terms. Interface 115 may transmit these selections to the runtime component 114 using well known network protocols over network 104.

At step 804, after receiving the search request, the runtime component 114 may be configured to identify the abstract record associated with the model entity identified in the search request. For example, the runtime component 114 may identify each table specified in the model entity relationships 225 for the selected model entity. Alternatively, the database abstraction model 148 may maintain a template of the abstract record for each model entity, e.g., the abstract record template for the "patient" model entity illustrated in FIG. 5. At step 806, the runtime component 114 determines a set of candidate logical fields from the abstract record (or columns from the tables included in the model entity relationships 225) that may contain the desired search terms.

In one embodiment, the database abstraction model 148 may specify a data type retrieved for a particular logical field. For example, melanoma test logical field $208_3$ might return a numerical data type. Similarly, the "note_detail" logical field (created to access data from note detail column of the "visit notes" table 316) might specify a text data type as the return type. The data type of the search term (e.g., text based search terms) should match the return of data retrieved by the logical field for purposes of comparison. If the types are different, a conversion between types may be preformed, or the field may be skipped and not included as a candidate logical field. In an alternative embodiment, the runtime component 114 may use the model entity relationships 224 to identify tables in the database 300 to search for the search term. Data from these tables may then be retrieved and compared against the search term.

At step 808, candidate logical fields may be queried to determine whether data in the database corresponding to the field contains the search term. This step is further illustrated below in conjunction with FIG. 9. Once the instances of the selected logical field are identified, these instances may be returned as a set of query results. In one embodiment, the runtime component 114 may transmit an indication of the query results to interface 115. In turn, at step 810, interface 115 may display the instances of the model entity, along with the logical field that generated a "hit" for the search term specified by the search request (e.g., the display presented by screen 700 in FIG. 7A). A user interacting with interface 115 may then navigate through instances of the model entity to obtain further detail or information about each instance, as desired.

Figure 9:
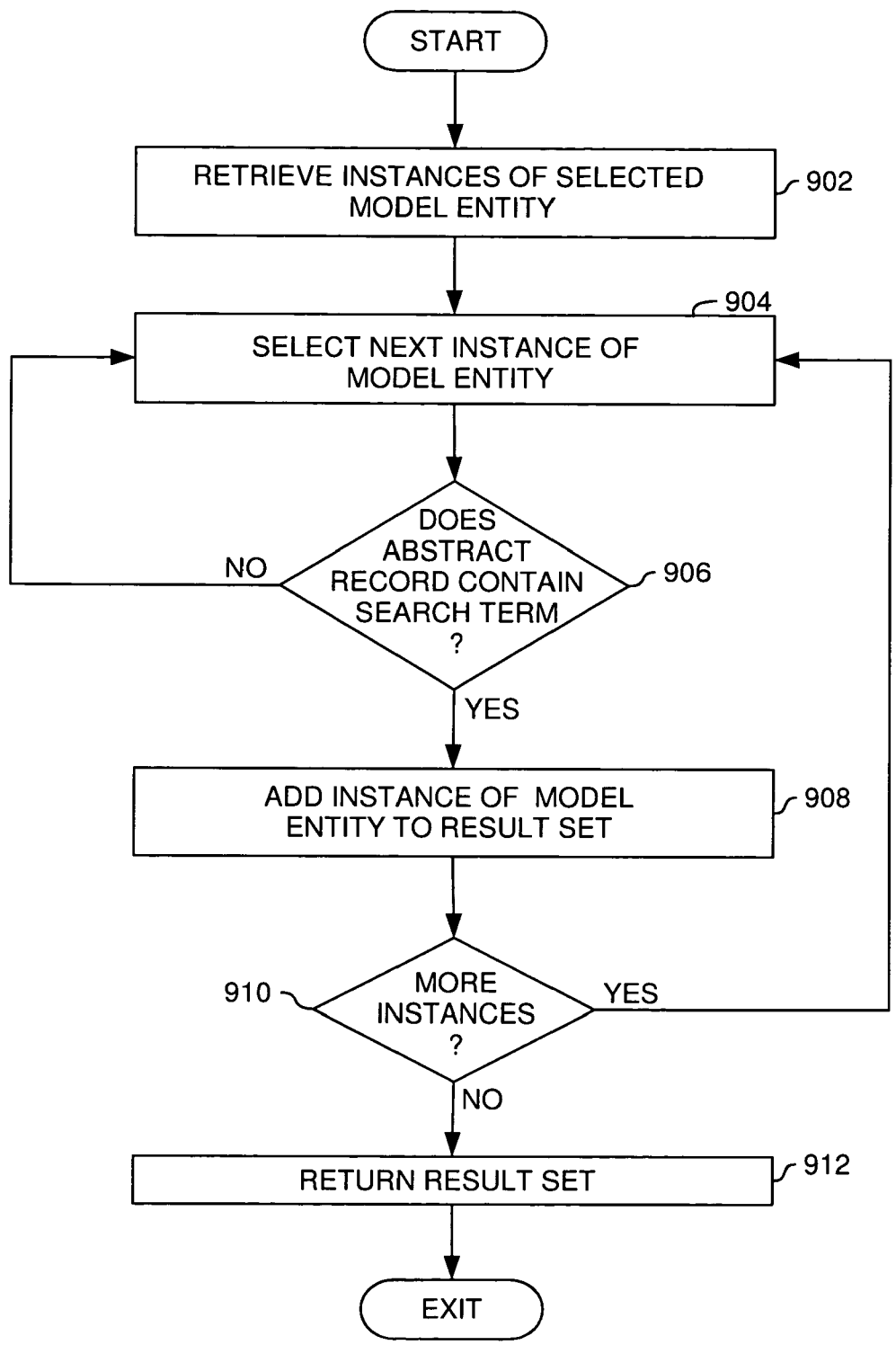
FIG. 9 illustrates a method for identifying instances of a model entity for which some associated data exists in the underlying database consistent with search criteria specified by a context insensitive model entity search request, according to one embodiment of the invention.

FIG. 9 illustrates a method 900 for identifying instances of a model entity for which some associated data exists in the underlying database that satisfies search criteria specified by a context insensitive model entity search request, according to one embodiment of the invention. For example, method 900 may be initiated as part of step 808 of method 800. The method begins after the runtime component 114 has received a search request that includes an indication of the model entity to search and the terms to search for. At step 902, instances of the model entity are retrieved. For example, using the search of the "patient" model entity depicted by FIG. 7, the "Patient ID logical field 2081 is used to access the "PID" values for instances of the "patient" model entity that exist in database 300. Steps 904-910 repeat for each instance retrieved at step 902.

At step 904, the next instance of the model entity is selected. At step 906, the method queries whether the abstract record for the selected instance contains the search term. In one embodiment, the runtime component may be configured to retrieve data for each instance of the model entity using the access method specified for each candidate logical field identified at step 806 of method 800. Once retrieved, the data is compared against the search terms. If the retrieved data matches the search terms, then the current instance of the model entity is added to the query result set at step 908. In one embodiment, the logical field that retrieved data matching the search term, along with the data retrieved for the logical field, is also included in the result set. Additionally, instances of the model entity may contain multiple references to the search term. In one embodiment, the user may specify a portion of the abstract record to search, or may limit the number of hits returned for each instance.

At step 910, the method queries whether additional instances of the model entity need to be evaluated for the search term. If so, the method returns to step 904. Otherwise, at step 912, the set of instances that contain the search term are returned.

In addition to extending the database abstraction model, embodiments of the invention may combine model entity searching with an abstract query. The abstract query may be used to specify a set of model entity to search using selected search terms. The combined query/search request may then be processed. For example, the abstract query of the patient model entity that includes the selection criteria "gender=female" could easily be combined with the search term "patients with references to melanoma." In one embodiment, query interface 115 includes control objects for users to specify a combined query/search.

CONCLUSION

Embodiments of the invention provide a database abstraction model that includes model entities and logical fields. Model entities describe a focal point or central entity being modeled by the database abstraction model. Logical fields are associated with an abstract record for the model entity. The abstract record identifies the scope of data about the model entity available through the database abstraction model. Once constructed, a database model may be accessed through a database query application that allows users to compose abstract queries and to search for instances of a model entity that includes a search term somewhere within the abstract record.

Generally an abstract query provides a context sensitive search, i.e., queries are composed that tend to isolate increasingly specific data by adding additional logical fields and conditions to an abstract query. In contrast, a context insensitive search begins with a selected model entity and engages in an increasingly broad search for instances of the model entity that include the specified search terms. Because the visibility of data in the underlying database for a model entity is limited to a set of relationships in the database abstraction model, searching by model entity allows a user to search for terms that occur only in tables containing data related to the model entity. Further, because the search is limited to the model entity, tables that may include the search term, but are nevertheless unrelated to the model entity, are excluded from search results (and not even queried). Thus, embodiments of the invention may improve the efficiency of searching, and the quality of search results.

The foregoing examples reference medical research environments. However, these examples are provided merely to illustrate embodiments and particular implementations. More broadly, embodiments of the invention are contemplated for any data environment including, for example, transactional environments, financial research environments, accounting environments, legal environments, and the like.

While the foregoing is directed to embodiments of the present invention, other and further embodiments of the invention may be devised without departing from the basic scope thereof, and the scope thereof is determined by the claims that follow.

What is claimed is:

1. A method of providing access to data in a database, comprising:
   receiving, from a requesting entity, a search request for data available through a database abstraction model, wherein the database abstraction model provides:
   (i) a plurality of logical fields each specifying an access method for accessing data in the database; and
   (ii) at least one model entity that specifies an identifier in the database used to identify instances of the model entity and further specifies a set of the logical fields used to access data related to the model entity, wherein the identifier comprises a primary key of a table in the database, and wherein the search request specifies the model entity to be searched and at least one search term;
   identifying, of the set of logical fields related to the model entity, logical fields that are candidates for containing data matching the at least one search term;
   accessing, for each instance of the model entity in the database, data for each of the identified logical fields using the access method specified for the respective identified logical field;
   identifying, for each instance, whether the accessed data contains the at least one search term, and if so, adding the identifier for the specific instance of the model entity to a set of search results; and
   returning the search results to the requesting entity.

2. The method of claim 1, wherein the search results comprise, (i) the identifiers for instances of the model entity specified in the search request that contain the at least one the search term in the data accessed by at least one of the logical fields in the set of logical fields, (ii), an indication of which logical field accessed data containing the search term, and (iii) the data retrieved for the logical field that contained the search term.

3. The method of claim 1, wherein the database is a relational database system and data is retrieved by a runtime component configured to use the access method specified for each logical field to generate and execute an SQL query of the relational database, and wherein the database abstraction model further specifies a set relationships between tables in the database, wherein each table specified in the relationship includes data related to the model entity.

4. The method of claim 1, wherein the set of the logical fields used to access data related to the model entity are identified by an abstract record, wherein the abstract record identifies a hierarchy for the set of logical fields, and wherein the logical field used to access the identifier for the model entity is placed at the root of the hierarchy.

5. The method of claim 4, further comprising:
   receiving, from the requesting entity, a request to view the abstract record for a selected instance of the model entity included the search results;
   retrieving data for at least one of the logical fields in the set of logical fields related to the model entity for the selected instance;
   populating a copy of the abstract record with the retrieved data; and
   returning the copy of the abstract record to the requesting entity.

6. The method of claim 5, wherein the abstract record is represented on a graphical user interface screen that presents the retrieved data for the instance of the model entity according to the hierarchy defined by the abstract record.

7. The method of claim 1, wherein the search request further specifies a set of instances of the model entity to be searched for the at least one search term, wherein the set of instances of the model entity are retrieved using an abstract query, wherein the abstract query specifies (i) the model entity being queried; (ii) a set of conditional expressions, wherein each conditional expression includes a logical field, a conditional operator, and a comparison value; and (iii) a set of logical fields used to retrieve query results for instances of the model entity that are consistent with the set of conditions.

8. The method of claim 1, further comprising:
providing a query building interface configured to provide an interface for composing the search request, wherein the query interface includes controls for selecting the model entity to be searched and for specifying the at least one search term.

9. The method of claim 1, wherein the search request further specifies at least one condition used to restrict instances of the model entity to be searched, to instances that satisfy the condition.

10. A computer readable storage medium containing a program which, when executed, performs an operation for providing access to data in a database, comprising:
receiving, from a requesting entity, a search request for data available through a database abstraction model, wherein the database abstraction model provides:
(i) a plurality of logical fields each specifying an access method for accessing data in the database; and
(ii) at least one model entity that specifies an identifier in the database used to identify instances of the model entity and further specifies a set of the logical fields used to access data related to the model entity, wherein the identifier comprises a primary key of a table in the database, and wherein the search request specifies the model entity to be searched and at least one search term;
identifying, of the set of logical fields related to the model entity, logical fields that are candidates for containing data matching the at least one search term;
accessing, for each instance of the model entity in the database, data for each of the identified logical fields using the access method specified for the respective identified logical field;
identifying, for each instance, whether the accessed data contains the at least one search term, and if so, adding the identifier for the specific instance of the model entity to a set of search results; and
returning the search results to the requesting entity.

11. The computer readable storage medium of claim 10, wherein the search results comprise, (i) the identifiers for instances of the model entity specified in the search request that contain the at least one the search term in the data accessed by at least one of the logical fields in the set of logical fields, (ii), an indication of which logical field accessed data containing the search term, and (iii) the data retrieved for the logical field that contained the search term.

12. The computer readable storage medium of claim 10, wherein the database is a relational database system and data is retrieved by a runtime component configured to use the access method specified for each logical field to generate and execute an SQL query of the relational database, and wherein the database abstraction model further specifies a set relationships between tables in the database, wherein each table specified in the relationship includes data related to the model entity.

13. The computer readable storage medium of claim 10, wherein the set of the logical fields used to access data related to the model entity are identified by an abstract record, wherein the abstract record identifies a hierarchy for the set of logical fields, and wherein the logical field used to access the identifier for the model entity is placed at the root of the hierarchy.

14. The computer readable storage medium of claim 13, wherein the operation further comprises:
receiving, from the requesting entity, a request to view the abstract record for a selected instance of the model entity included the search results;
retrieving data for at least one of the logical fields in the set of logical fields related to the model entity for the selected instance;
populating a copy of the abstract record with the retrieved data; and
returning the copy of the abstract record to the requesting entity.

15. The computer readable storage medium of claim 14, wherein the abstract record is represented on a graphical user interface screen that presents the retrieved data for the instance of the model entity according to the hierarchy defined by the abstract record.

16. The computer readable storage medium of claim 10, wherein the search request further specifies a set of instances of the model entity to be searched for the at least one search term, wherein the set of instances of the model entity are retrieved using an abstract query, wherein the abstract query specifies (i) the model entity being queried; (ii) a set of conditional expressions, wherein each conditional expression includes a logical field, a conditional operator, and a comparison value; and (iii) a set of logical fields used to retrieve query results for instances of the model entity that are consistent with the set of conditions.

17. The computer readable storage medium of claim 10, wherein the operation further comprises:
providing a query building interface configured to provide an interface for composing the search request, wherein the query interface includes controls for selecting the model entity to be searched and for specifying the at least one search term.

18. The computer readable storage medium of claim 10, wherein the search request further specifies at least one condition used to restrict instances of the model entity to be searched, to instances that satisfy the condition.

19. A system for providing a database abstraction model of a physical database, comprising:
one or more computer processors;
the physical database;
the database abstraction model, wherein the database abstraction model provides:
(i) a plurality of logical fields each specifying an access method for accessing data in the physical database; and
(ii) at least one model entity that specifies an identifier in the physical database used to identify instances of the model entity and further specifies a set of the logical fields used to access data in the physical database related to the model entity; and
a runtime component executable by the one or more computer processors and configured to receive, from a requesting entity, a search request that specifies the model entity to be searched and at least one search term, and, in response, to:

of the set of logical fields related to the model entity specified in the search request, identify logical fields that are candidates for containing data matching the at least one search term;

for each instance of the model entity in the database as determined by the identifier of the model entity, access data for each of the identified logical fields using the access method specified for the respective identified logical field;

identify, for each instance, whether the accessed data contains the at least one search term, and if so, adding the identifier for the specific instance of the model entity to a set of search results; and return the set of search results to the requesting entity.

\* \* \* \* \*